US012355221B2

(12) United States Patent
Eisele et al.

(10) Patent No.: US 12,355,221 B2
(45) Date of Patent: Jul. 8, 2025

(54) SHAVING TOOL WITH UPRIGHT HANDLE

(71) Applicant: Hubbell Power Systems, Inc., Shelton, CT (US)

(72) Inventors: Will Eisele, Rocky Hill, CT (US); Mark Fowler, Birmingham (GB); Orelvis Migenes, Plainville, CT (US); Brian Bourgoin, East Haddam, CT (US)

(73) Assignee: Hubbell Power Systems, Inc., Shelton, CT (US)

( * ) Notice: Subject to any disclaimer, the term of this patent is extended or adjusted under 35 U.S.C. 154(b) by 476 days.

(21) Appl. No.: 17/735,574

(22) Filed: May 3, 2022

(65) Prior Publication Data

US 2022/0357510 A1    Nov. 10, 2022

Related U.S. Application Data

(60) Provisional application No. 63/185,595, filed on May 7, 2021.

(51) Int. Cl.
*H02G 1/12*  (2006.01)
*G02B 6/245*  (2006.01)

(52) U.S. Cl.
CPC ............ *H02G 1/1217* (2013.01); *H02G 1/12* (2013.01); *H02G 1/1204* (2013.01); *G02B 6/245* (2013.01)

(58) Field of Classification Search
CPC ........ B26B 29/02; H02G 1/12; H02G 1/1204; H02G 1/1217; H02G 1/1229; G02B 6/245

(Continued)

(56) References Cited

U.S. PATENT DOCUMENTS

| 1,692,030 A | * | 11/1928 | Friedman | H02G 1/1229 |
| | | | | 30/91.2 |
| 1,739,972 A | * | 12/1929 | Klinger | H02G 1/1217 |
| | | | | 30/90.4 |

(Continued)

FOREIGN PATENT DOCUMENTS

| CH | 408144 A | * | 2/1966 | ........... H02G 1/1229 |
| DE | 1925880 A1 | * | 11/1970 | ........... H02G 1/1229 |

(Continued)

OTHER PUBLICATIONS

Ripley Tools, RBT Riser Break-out Tool, Dec. 1, 2012, Cromwell CT, USA.

(Continued)

*Primary Examiner* — Jason Daniel Prone
(74) *Attorney, Agent, or Firm* — Ruggiero McAllister & McMahon LLC

(57) ABSTRACT

A cable shaving tool including a blade holder having a guide channel extending along the blade holder length. The guide channel includes a cable channel, and a control surface at opposing ends. A removable blade is secured to a blade support surface and the blade edge extends within the guide channel. The blade support and handle are disposed along a central axis. The shaving depth is determined by the differential between: (1) the distance from the cable channel to the bottom surface of the blade holder; and (2) the distance from the control surface to the bottom surface of the blade holder. The handle is secured to the blade holder and extends along the central axis, allowing an operator's hand to be positioned directly over the blade during a cut, apply a downward pressure on the cable to set the blade and then move the tool in a direction parallel to the cable length.

11 Claims, 12 Drawing Sheets

(58) Field of Classification Search
USPC ............................ 30/90.4, 90.7–91.2; 81/9.4
See application file for complete search history.

(56) References Cited

U.S. PATENT DOCUMENTS

| | | | | |
|---|---|---|---|---|
| 2,100,638 | A * | 11/1937 | Doolittle | H02G 1/1217 30/90.4 |
| 2,235,575 | A * | 3/1941 | Edwards | H02G 1/1229 30/91.2 |
| 2,329,805 | A * | 9/1943 | Wilson, Sr. | H02G 1/1229 30/90.4 |
| 2,468,122 | A * | 4/1949 | Shepard | H02G 1/1229 30/90.4 |
| 2,691,822 | A * | 10/1954 | Vaughan, Jr. | H02G 1/1217 30/90.4 |
| 2,761,211 | A * | 9/1956 | Grant | H02G 1/1217 30/90.8 |
| 2,819,520 | A * | 1/1958 | Eyles | H02G 1/1217 30/90.8 |
| 2,835,031 | A * | 5/1958 | Cook, Jr. | H02G 1/1229 30/90.6 |
| 2,943,391 | A * | 7/1960 | Shannon | H02G 1/1229 30/90.8 |
| 3,057,232 | A * | 10/1962 | Cornell, Jr. | H02G 1/1229 30/90.8 |
| 3,091,031 | A * | 5/1963 | Grant | H02G 1/1231 30/90.7 |
| 3,092,906 | A * | 6/1963 | Deering | H02G 1/1229 30/90.4 |
| 3,169,315 | A * | 2/1965 | Mankovitz | H02G 1/1229 30/91.2 |
| 3,238,618 | A * | 3/1966 | Cook, Jr. | H02G 1/1217 30/90.4 |
| 3,535,785 | A * | 10/1970 | Matthews | H02G 1/1229 30/91.2 |
| 3,611,571 | A * | 10/1971 | Belling | H02G 1/02 30/90.4 |
| 3,613,235 | A * | 10/1971 | McCormick | H02G 1/1217 30/91.1 |
| 3,624,901 | A * | 12/1971 | Pettit et al. | H02G 1/1229 30/91.2 |
| 3,703,035 | A * | 11/1972 | Handy | H02G 1/1217 30/90.9 |
| 3,750,281 | A * | 8/1973 | Belling | H02G 1/02 30/90.8 |
| 3,777,397 | A * | 12/1973 | Johnson | H02G 1/1229 30/91.2 |
| 3,818,591 | A * | 6/1974 | Peter | H02G 1/1217 30/90.9 |
| 3,898,733 | A * | 8/1975 | Cormier | H02G 1/1217 30/90.4 |
| 3,906,561 | A * | 9/1975 | Bawa | H02G 1/1217 30/90.4 |
| 3,922,779 | A * | 12/1975 | Cormier | H02G 1/1217 30/91.1 |
| 3,938,248 | A * | 2/1976 | Krampe | H02G 1/1217 30/90.9 |
| 4,001,934 | A * | 1/1977 | Bell | B26B 27/00 30/90.4 |
| 4,026,017 | A * | 5/1977 | Arnold | H02G 1/1229 30/90.6 |
| 4,081,903 | A * | 4/1978 | Cormier | H02G 1/1217 30/90.8 |
| 4,215,470 | A * | 8/1980 | Chirichigno | H02G 1/1217 30/90.8 |
| 4,434,554 | A * | 3/1984 | Korbelak | G02B 6/245 30/90.8 |
| 4,472,877 | A * | 9/1984 | Undin | H02G 1/1231 30/90.7 |
| 4,489,491 | A * | 12/1984 | Gregson | H02G 1/1202 30/90.7 |
| 4,503,612 | A * | 3/1985 | Davis | B26B 29/02 30/294 |
| 4,536,957 | A * | 8/1985 | Britton | H02G 1/1217 30/90.4 |
| 4,667,406 | A * | 5/1987 | Krampe | H02G 1/1229 30/91.2 |
| 4,897,920 | A * | 2/1990 | Dunbar | H02G 1/1217 30/90.4 |
| 5,561,903 | A * | 10/1996 | Bourbeau | H02G 1/1217 30/90.4 |
| 5,577,150 | A * | 11/1996 | Holder | G02B 6/566 30/90.4 |
| 5,632,088 | A * | 5/1997 | Naso | E04G 21/12 30/91.2 |
| 5,771,587 | A * | 6/1998 | Herold | B26D 3/065 30/294 |
| 5,864,953 | A * | 2/1999 | Blake | B26B 27/00 30/90.4 |
| 5,887,346 | A * | 3/1999 | McCasland | F16L 41/06 30/90.4 |
| 6,108,910 | A * | 8/2000 | Sorkin | H02G 1/1221 30/91.2 |
| 6,148,521 | A * | 11/2000 | Eslambolchi | G02B 6/566 30/90.9 |
| 6,192,588 | B1 * | 2/2001 | Krampe | H02G 1/1214 30/91.2 |
| 6,427,331 | B1 * | 8/2002 | Tarpill | H02G 1/1217 30/91.2 |
| 6,568,085 | B1 * | 5/2003 | Bede | B26D 3/001 30/90.4 |
| 7,103,978 | B1 * | 9/2006 | Temple | H02G 1/1217 30/90.4 |
| 8,393,250 | B2 * | 3/2013 | Schumacher | H02G 1/1229 30/90.4 |
| 10,459,185 | B2 * | 10/2019 | Eisele | H02G 1/1229 |
| 10,795,085 | B2 * | 10/2020 | Eisele | G02B 6/245 |
| 11,167,439 | B2 * | 11/2021 | Mayer | B26B 29/06 |
| 11,789,229 | B2 * | 10/2023 | Hoffman | G02B 6/245 385/134 |
| 11,886,028 | B1 * | 1/2024 | Eisele | G02B 6/567 |
| 12,062,890 | B2 * | 8/2024 | Eisele | G02B 6/245 |
| 2010/0024604 | A1 * | 2/2010 | Nelson | H02G 1/1229 81/9.4 |
| 2015/0047207 | A1 * | 2/2015 | Chernyshou | B26B 29/06 30/169 |
| 2015/0128425 | A1 * | 5/2015 | Wilcox | H02G 1/1229 30/90.1 |
| 2015/0378126 | A1 * | 12/2015 | Migenes | G02B 6/566 30/90.1 |
| 2021/0237295 | A1 * | 8/2021 | Eisele | H02G 1/12 |
| 2022/0294197 | A1 * | 9/2022 | Rishkel | H02G 1/1229 |
| 2024/0405526 | A1 * | 12/2024 | Eisele | G02B 6/245 |

FOREIGN PATENT DOCUMENTS

| | | | | |
|---|---|---|---|---|
| FR | 955573 | A * | 1/1950 | ............ H02G 1/1217 |
| GB | 704488 | A * | 2/1954 | ............ H02G 1/1217 |
| GB | 2229324 | A * | 9/1990 | ............ H02G 1/1229 |
| GB | 2468705 | A * | 9/2010 | ............ H02G 1/1217 |
| KR | 20110112081 | A * | 10/2011 | ............ H02G 1/1217 |

OTHER PUBLICATIONS

"RTRYVA Tool," Web page <https://www.maser.co.nz/products/emtelle-air-blown-fibre-systems/rtryva-flexible-duct-system-with-pre-installed-loose-fibres/>, 1 page, Aug. 26, 2017, retrieved from Internet Archive Wayback Machine <https://web.archive.org/web/20171117055822/https://www.maser.co.nz/products/emtelle-air-blown-fibre-systems/rtryva-flexible-duct-system-with-pre-installed-loose-fibres/> on May 12, 2022.

* cited by examiner

SHAVING TOOL WITH UPRIGHT HANDLE

BACKGROUND OF THE INVENTION

1. Field of the Invention

The present invention relates to a cable having tool for accessing cables which are preferably mid-span and more specifically, accessing cables in small or hard to reach locations.

2. Description of Related Art

Fiber optic cables continue to evolve and fiber optic cable installation in buildings, particularly the final leg of a telecommunications network that delivers services to retail end users (the "last mile") required cables to be run around dwellings requiring many junctions. These junctions are traditionally done with a termination box, similar to electrical wiring. Fiber cables are typically run through the box and requires an access cut to be made through the outer sheathing/jacket to gain access to the fiber optic cable inside. This "midspan cut" is critical to gain access, and must also be conducted with precision so the depth of the cut does not damage the fibers under the outer jacket. Many cables are run in and through buildings requiring durable outer jackets.

Since much of this work is required to be conducted inside the junction box 88, 88' such as shown in FIGS. 2B and 3, many tools are too large or bulky to be able to effectively make a midspan cut within the confines of the junction box. While hand tools exist in the market today which provide midspan cuts to cable jackets using differing modalities, they are not without shortcomings. Two examples including slitting operations performed using slitting tools and shaving operations performed by shaving tools.

Slitting tools provide a split cut to the outer jacket of a cable, but they are not effective when used on cables that are installed vertically on a wall since the cable is not readily accessible for the slitting blade to cut. Shaving tools allow for the end user to place the tool the cable and pull the tool along the length of the cable, creating a shave cut through the outer jacket to access the fibers. Shaving tools are useful when working on cables that are installed on walls since the tool "skims" the outer jacket of the cable, thereby shaving the outer exposed face of the cable. These tools have a low angled blade (less than 20°) which digs into the jacket when the tool is placed on the cable. When the tool is pulled, the blade begins to cut, and the tool channel provides control to regulate the depth of cut.

Cable shaving tools of the prior art, particularly like those depicted in FIGS. 1A-2B, typically utilize a downstream channel and require overall pressure along the entire tool to regulate the blade depth. As a result, these tools typically have a larger footprint which makes the shaving tool cumbersome to work with and are ineffective at working within the confines of a junction box. While cable shaving tools of the prior art have incorporated handles to work within the tight spaces of junction boxes, these handles still provide limited access in junction boxes. The tools are particularly challenged in smaller or high-walled junction boxes, since the handles are essentially extensions of the current tool platforms. In addition, the handles of the prior art shaving tools are at the end of a longer tool chassis, requiring a longer guide channel to operate properly and establish the correct cutting datum. Thus, a need exists in the prior art for a cable shaving tool which allows for maximum access to perform midspan shaving cuts inside tight junction boxes.

SUMMARY OF THE INVENTION

Bearing in mind the problems and deficiencies of the prior art, it is therefore an object of the present invention to provide a cable shaving tool which creates a maximum clearance and minimizes the footprint of the tool.

It is another object of the present invention to provide a cable shaving tool with a minimal guide channel which can control the blade cutting depth of a midspan shave cut.

A further object of the invention is to provide a cable shaving tool which requires minimal downward pressure in order to affect a midspan shaving operation.

It is yet another object of the present invention to provide a cable shaving tool which can safely, easily, and effectively perform midspan shaving operations on a cable within a junction box.

Still other objects and advantages of the invention will in part be obvious and will in part be apparent from the specification.

The above and other objects, which will be apparent to those skilled in the art, are achieved in the present invention which is directed to a cable shaving tool for shaving of a cable jacket, the cable shaving tool comprising a blade holder having a guide channel extending along a length of said blade holder for guiding the blade holder along a cable length, the guide channel further including a first end having a cable channel, and a second end having a control surface, a blade removably securable to a blade support surface disposed in the blade holder and extending within the guide channel and between the first end and the second end, the blade support disposed on the blade holder at a central axis of the cable shaving tool, the cable channel having an apex, the apex having a first distance to a bottom surface of the blade holder, the control surface having a second distance to the bottom surface of the blade holder, and a handle removably securable to the blade holder having a handle length extending along the central axis in a direction perpendicular to the guide channel, allowing an end user's hand to be positioned directly over the blade during a cut. The handle may allow the end user to place the cable within the cable shaving tool guide channel, apply a downward pressure on the cable to set the blade and then move the cable shaving tool in a direction parallel to the cable length to initiate the cut, wherein the blade initiates the cut a predetermined depth into the cable, such that the predetermined depth is a differential between the cable channel first distance and the control surface second distance. The guide channel may further include a clearance area between the first end and the second end. The clearance area may be disposed over the blade to allow for a cable jacket chip to pass through the cable shaving tool during the cut. The cable may be in a location having limited access. The cable shaving tool may be used for midspan shaving of the cable or shaving an end of the cable. The cable channel may include a bevel along the first end.

The present invention also provides for a blade holder for a cable shaving tool, the blade holder comprising a housing having a bottom surface and a length, a guide channel extending within the housing length for guiding the blade holder along a cable length, the guide channel further including a first end having a cable channel, and a second end having a control surface, a blade support surface within an interior of said housing, a blade removably securable to the blade support surface such that an edge of said blade extends within the guide channel between the first end and the second end, the cable channel having an apex, the apex having a first distance to the housing bottom surface, the control surface having a second distance to the bottom surface of the blade holder, wherein after placement of the cable within the guide channel, the blade initiates a cut of a predetermined depth into the cable, such that the predetermined depth is a differential between the cable channel first distance and the control surface second distance. The guide channel may further include a clearance area between the first end and the second end. The clearance area may be disposed over the blade to allow for a cable jacket chip to pass through the blade holder during the cut. The cable may be in a location having limited access. The cable channel may include a bevel along the first end.

The present invention further provides for a method of shaving a cable having a jacket comprising providing cable shaving tool comprising a blade holder having a guide channel extending along a length of the blade holder for guiding the blade holder along a cable length, the guide channel further including a first end having a cable channel, and a second end having a control surface, a blade removably securable to a blade support surface disposed in the blade holder such that an edge of the blade extends within the guide channel between the first end and the second end, the blade support disposed on the blade holder at a central axis of the cable shaving tool, the cable channel having an apex, the apex having a first distance to a bottom surface of the blade holder, the control surface having a second distance to the bottom surface of the blade holder, and a handle removably securable to the blade holder having a handle length extending along the central axis in a direction perpendicular to the guide channel, gripping the handle such that an end user's hand is positioned directly over the blade, placing a portion of the cable within the guide channel, applying a force to the cable in a direction perpendicular to the cable length such that the blade edge is set within the cable, drawing the cable shaving tool along the length of the cable such that the blade severs the cable jacket, thereby shaving a portion of the cable jacket a predetermined depth determined by a differential between the cable channel first distance and the control surface second distance. The cable may be in a location having limited access. The guide channel may further include a clearance area between the first end and the second end, and wherein the portion of the cable jacket shaved extends within the clearance area during the step of drawing the cable shaving tool along the length of the cable.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1A:
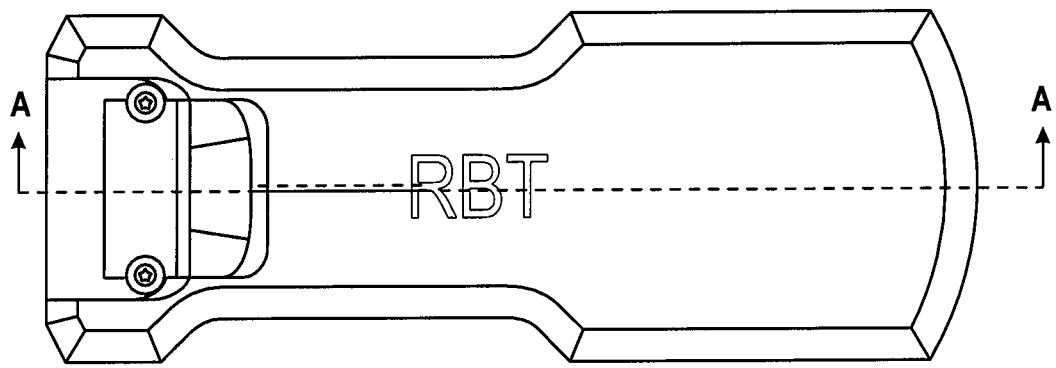
FIG. 1A is a top plan view of a cable shaving tool of the prior art.
Figure 1B:
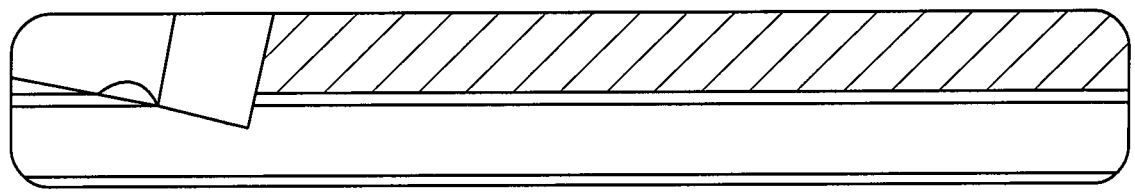
FIG. 1B is a cross-sectional side elevational view of the prior art of FIG. 1A, along lines A-A.
Figure 2A:
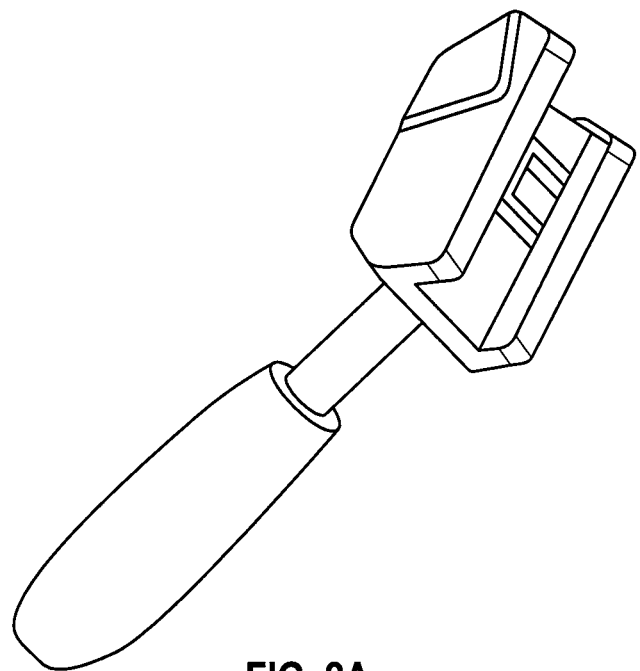
FIG. 2A is a perspective view of a cable shaving tool of the prior art.
Figure 2B:
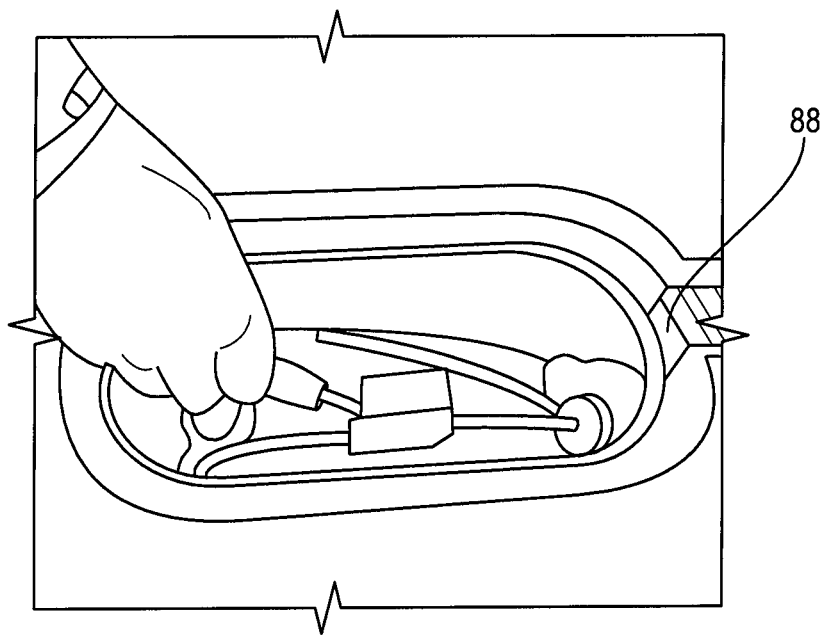
FIG. 2B is a perspective view of the prior art of FIG. 2A, during operation inside a junction box.
Figure 3:
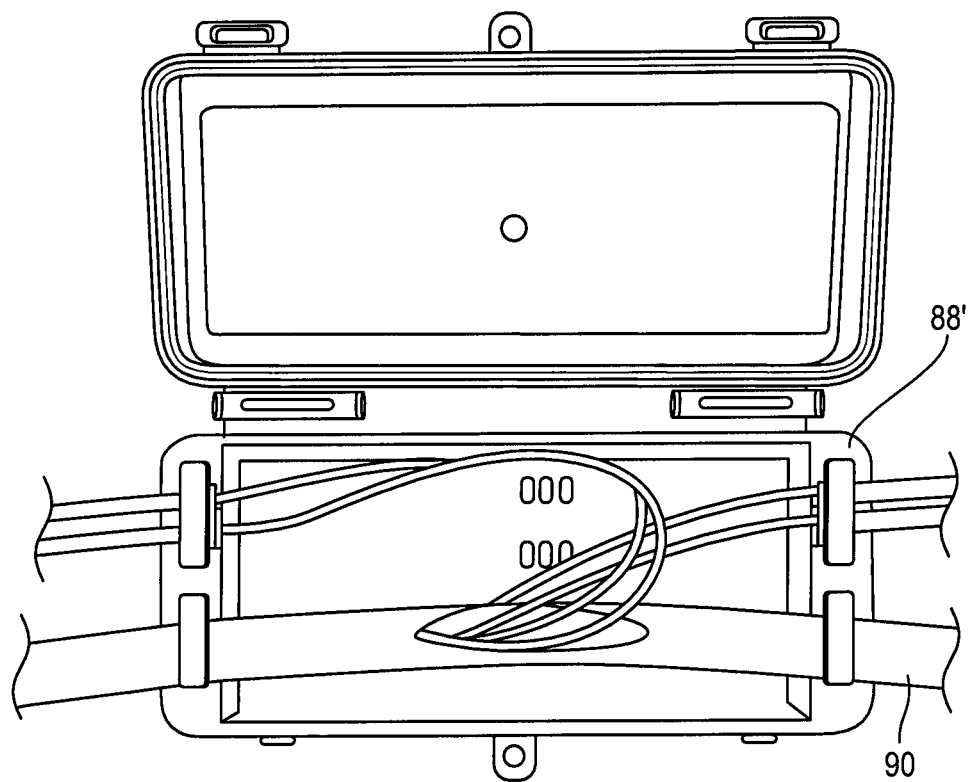
FIG. 3 is a top plan view of a junction box including a cable portion therein.

In describing the embodiment of the present invention, reference will be made herein to FIGS. 4-17 of the drawings in which like numerals refer to like features of the invention.

The tool covered in this invention utilizes a vertical handle and places the handle directly over the cutting blade. This creates a maximum clearance and minimizes the footprint of the tool. The handle and geometry create a unique approach to the application and the end user's hand is located directly over the blade. The handle geometry allows for the end user to simultaneously apply downward pressure and the pulling action required for the cut. The small footprint of the blade holder is minimized to essentially act as a holder for the blade and a minimal guide channel to control the blade cutting depth As shown in FIGS. 5-6, 7A, 7B, and 12 the cable shaving tool 10 is shown having a blade holder 20 located at a lower end of the tool 10 and a handle 40 located at the upper end of the tool. As shown, the handle 40 and blade 30 are located central with respect to the tool along central longitudinal axis 12. The handle extends along the axis 12 and is approximately perpendicular to the blade 30 (see also FIG. 8). At the lower end of the tool, a blade holder 20 includes a guide channel 26 which extends along the length of the blade holder 20, perpendicular to handle 40 and axis 12, for placement of a cable 90 within the tool 10. Blade holder 20 may be incorporated within the handle 40 as a single construction or removably secured to the handle 40 by way of fasteners 92 extending from openings 16 within a flanged section or base section 42 of the handle 40 to receiving apertures 14 within the blade holder 20. A portion of the guide channel 26 beginning at blade holder end 20a before blade edge 31 includes a cable channel 24 (discussed in detail below) which may be rounded or some other similar configuration. Opposite blade holder end 20b is disposed within guide channel 26 a control surface 60, which may be flat or some other similar configuration. It should be understood by a person of skill in the art that the control surface and cable channel could be any shape or construction which would facilitate cable shaving operations to cable midspans or cable ends.

Figure 4:
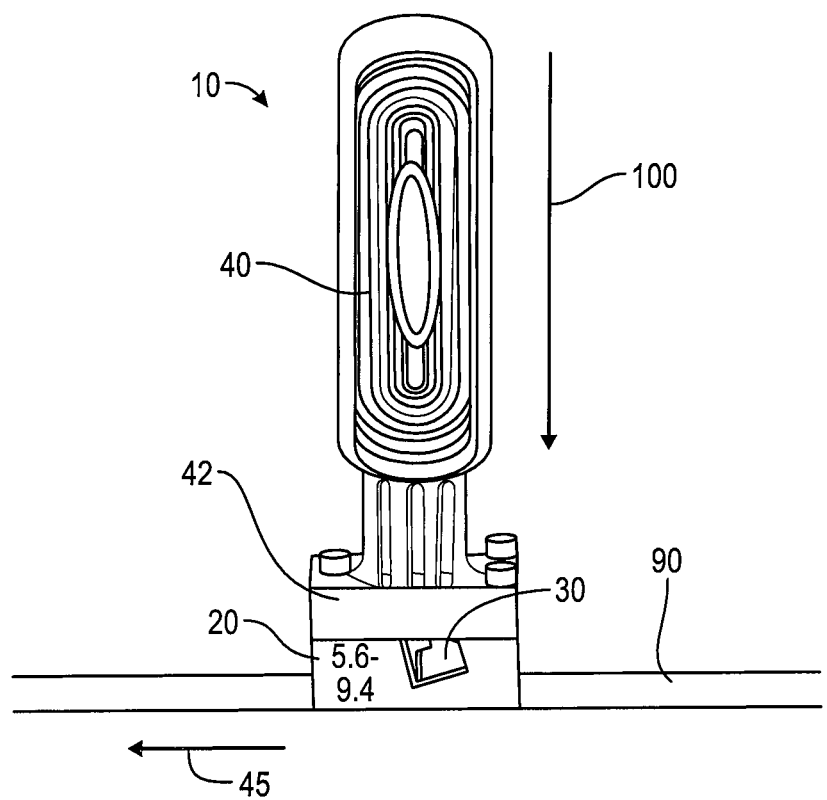
FIG. 4 is a side elevational view of the cable shaving tool of the present invention, after placement of a cable within the device.
Figure 5:
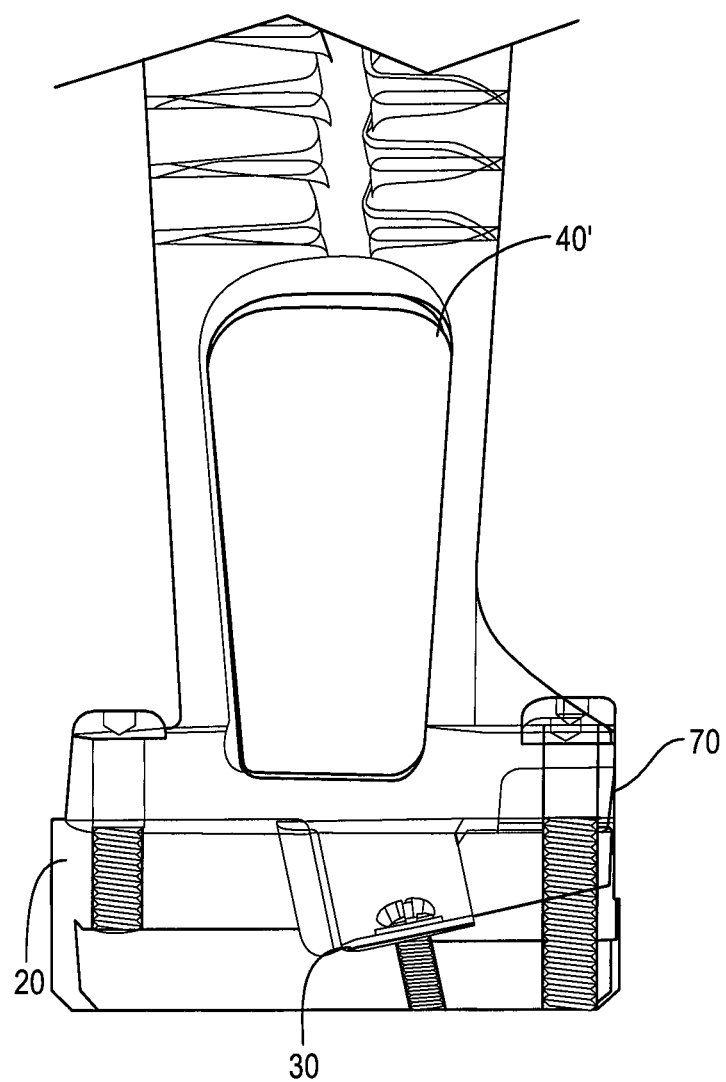
FIG. 5 is an enlarged, transparent, partial side elevational view of the cable shaving tool of the present invention.
Figure 6:
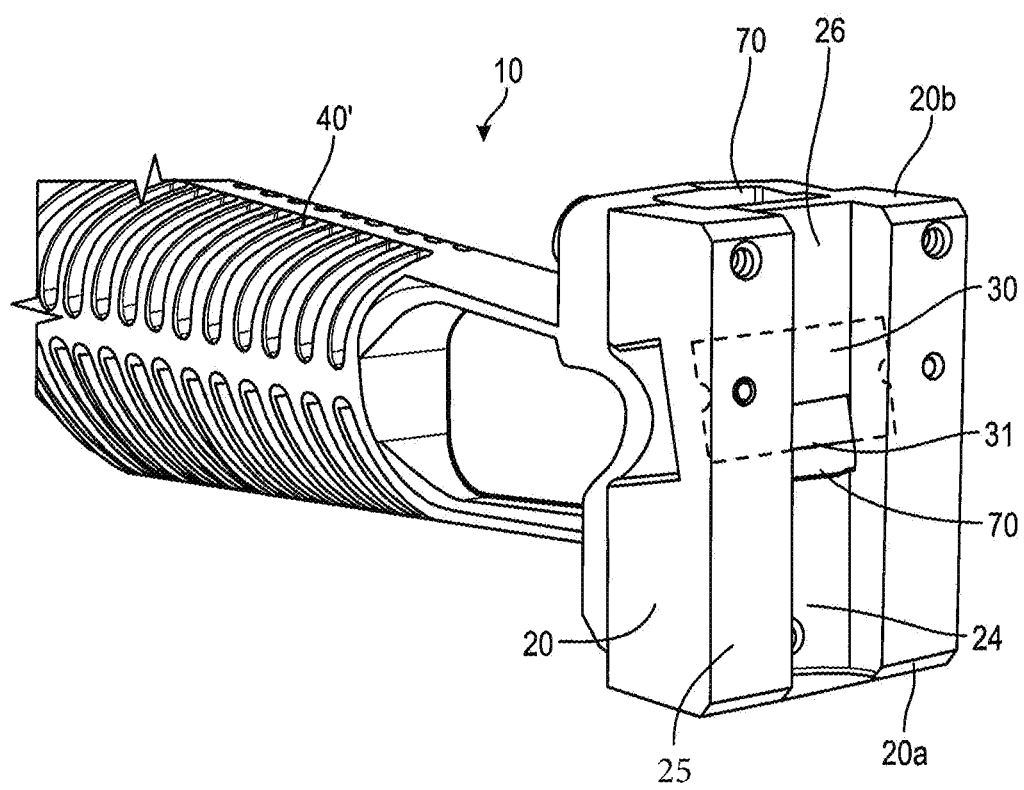
FIG. 6 is a perspective view of the cable shaving tool of the present invention.
Figure 7A:
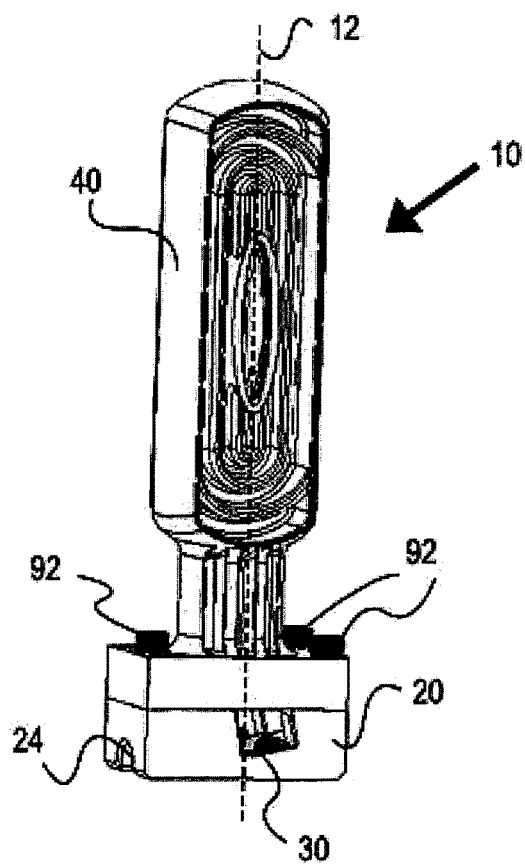
FIG. 7A is a perspective view of an embodiment of the cable shaving tool of the present invention.
Figure 7B:
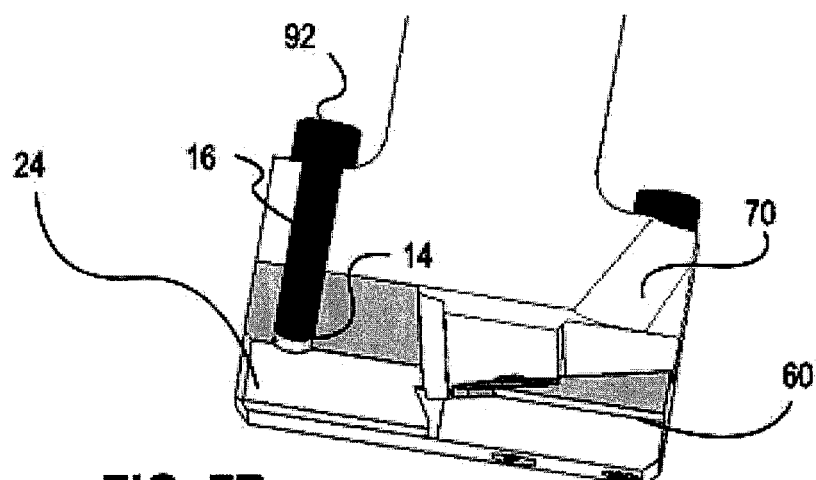
FIG. 7B is a partial, enlarged cross-sectional view of the cable shaving tool of FIG. 7A, about the lower end of the tool which includes the blade.
Figure 8:
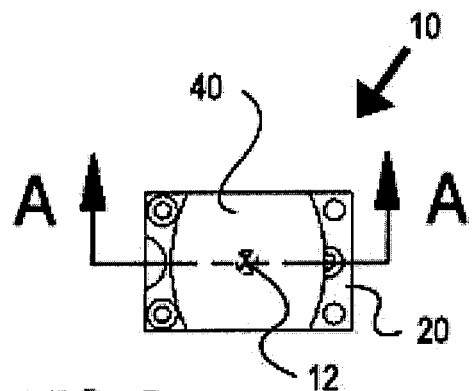
FIG. 8 is a top plan view of the cable shaving tool of FIG. 7A.

As depicted in FIG. 4, the placement of the blade 30 relative to the handle 40 permits an end user to place a cable 90 within the tool along the guide channel 26, apply light downward pressure 100 to set the blade into position such that it may begin to shave the cable's outer jacket and then move tool 10 along the length of the cable 90 in direction 45 to initiate the cut. As seen in FIGS. 5-6, and 7B, the tool also has a clearance area 70 within blade holder 20 adjacent the blade support 36 to allow for the jacket chip 72 to pass through the tool during a cut and subsequently exits the blade holder at end 20b. Since the forces applied to the cable by the tool are directed over the blade 30, the blade holder 20 has a cable channel 24 which need not extend the entire length of the blade holder 20. This advantageously allows for cable shaving operations which do not require twisting actions of the tool, and may be of further advantage in areas in which the cable shaving tool is located within a junction box or other areas of limited clearance. In additional the control surface 60 immediately downstream of the blade acts as a snubber to control the depth of cut. Thus, the guide channel 26 of the present invention may include a smaller overall footprint, as the handle 40 immediately over the blade facilitates operation of the tool and initiation of the cutting actions.

Figure 9:
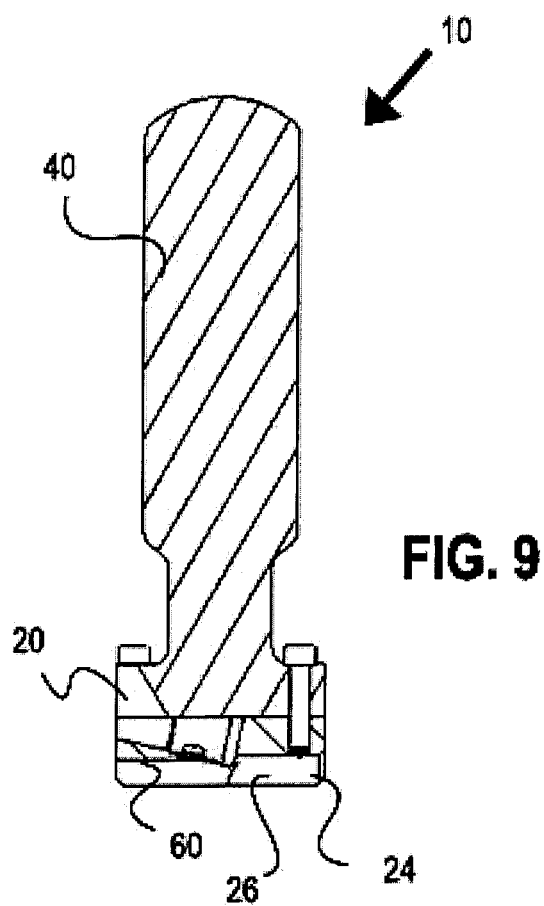
FIG. 9 is a side cross-sectional view of the cable shaving tool of FIG. 8, along lines A-A.
Figure 10:
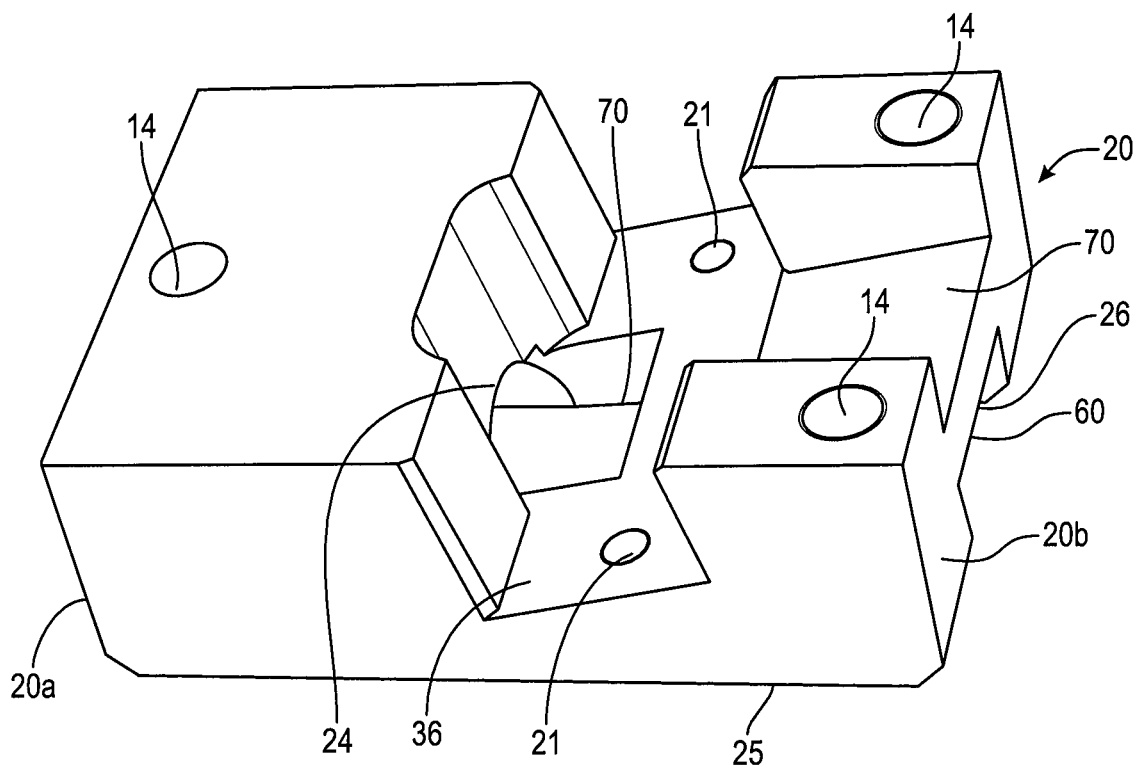
FIG. 10 is a top perspective view of the blade holder of the cable shaving tool of the present invention.
Figure 11:
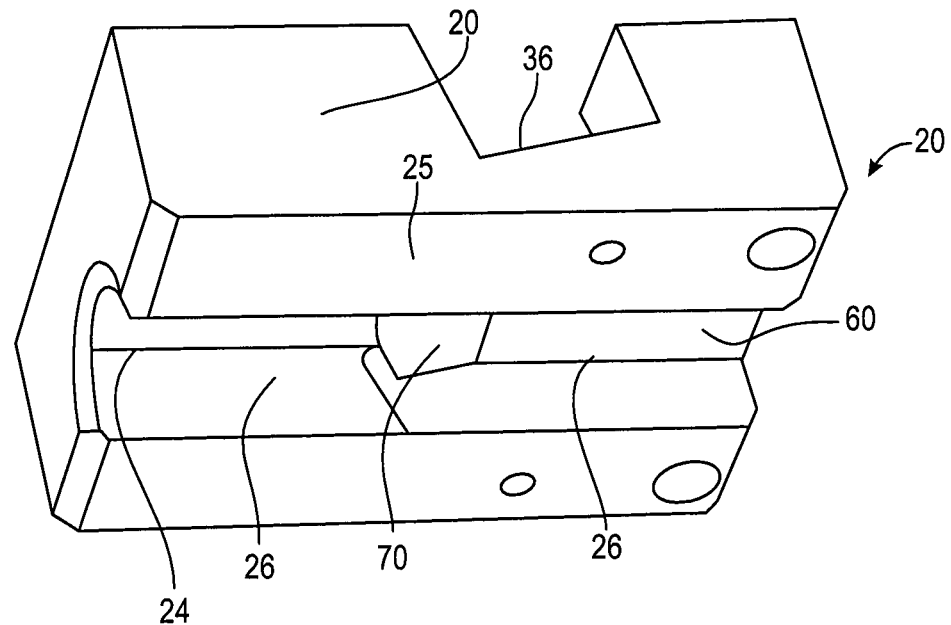
FIG. 11 is a bottom perspective view of the blade holder of the cable shaving tool of the present invention.
Figure 12:
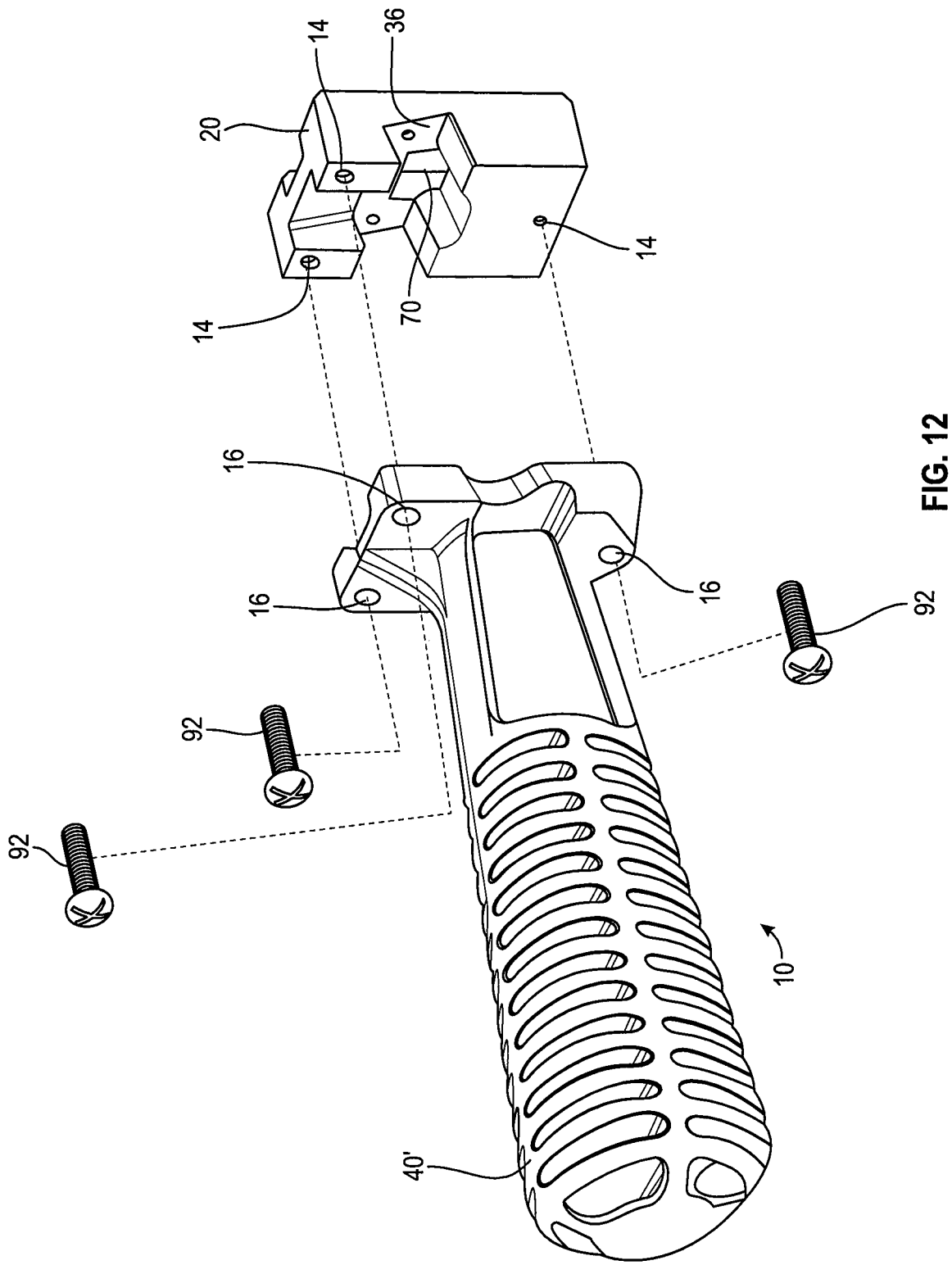
FIG. 12 is an exploded perspective view of the cable shaving tool of the present invention.

As seen in the cross-sectional view of FIG. 9, and FIGS. 10-11, the guide channel 26 of blade holder 20 includes a control surface 60 disposed in the guide channel 26. The upper portion of the blade holder 20 opposite bottom surface 25 includes an inclined blade support surface 36 disposed within the clearance area 70 which receives a blade 30 and includes one or more openings 21 in which to secure a blade 30 within the blade support surface 36. The blade support surface 36 is angled with respect to the horizon to provide a shaving cut along the outer jacket of a cable, and may be of any angle which is necessary to perform such operations, for example, less than 20 degrees from the horizontal. Once secured to the angled blade support surface 36, a portion of blade edge 31 protrudes within the guide channel 26 such when a cable 90 is placed within the blade holder 20, the edge 31 will begin to sever a portion of a cable jacket, creating a jacket chip 72 which will begin to extend within clearance area 70. As chip 72 exits blade holder end 20b, an operator may determine the depth of shave conducted along the cable 90 as the tool moves along the cable in shaving direction 45 is proper for the type of cable being shaved. Unlike cable shaving tools of the prior art, the cable shaving tool of the present invention utilizes the blade control surface 60 to regulate the cut. Thus, the cable shaving tool of the present invention does not depend on the size of the channel downstream of the blade edge or the overall pressure along the entire tool to regulate the shave depth of the blade, and similarly does not require any twisting action to perform shaving operations. This allows for the present invention to incorporate a shorter necessary tooling footprint along the length of a cable, allowing the present invention to perform shaving operations in difficult to access areas, including areas with very limited clearances, like those of FIG. 14, which are performed within junction box 88". In addition, the vertical handle immediately over the blade allows an operator to initiate cutting actions in these enclosed areas, while simultaneously providing a consistent shaving depth by requiring only slight downward pressure on the cable to set the blade and movement of the tool along the length of the cable.

Figure 15:
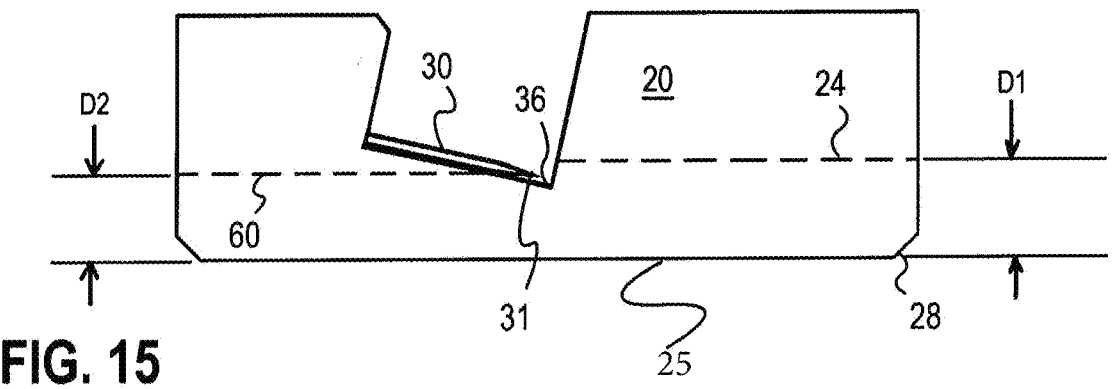
FIG. 15 is a side elevational view of the blade holder of the cable shaving tool of the present invention including the blade.
Figure 16:
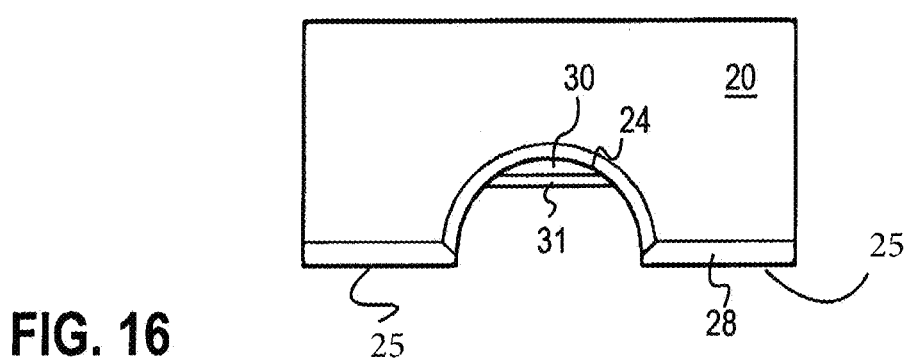
FIG. 16 is a front elevational view of the blade holder of FIG. 15.
Figure 17:
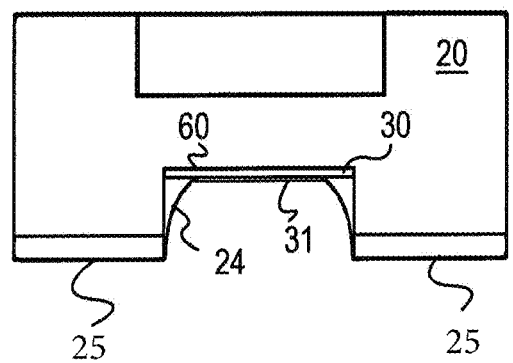
FIG. 17 is a rear elevational view of the blade holder of FIG. 15.

As shown in FIG. 15-17, the shaving depth or cut depth of the blade holder 20 of the present invention is depicted. As shown, distance D1 at the leading edge or front of the blade holder 20a extends from the top of the cable channel 24 to the bottom surface 25 of the blade holder 20. Similarly, distance D2 at the opposite edge or rear of the blade holder 20b extends from the control surface 60 to the bottom surface 25 of the blade holder 20. Thus, the cable shaving depth or blade depth is therefore determined by the differential between distance D1 and distance D2. As the cable shaving tool 10 is drawn across the cable 90, the portion of the jacket 90 contacting the channel 24 apex is sliced and travels along the clearance area 70, along the upper surface of the blade 30, where it will exit to the exterior of the tool at end 20b. As an operator pulls the shaving tool in direction 45, the fibers or conductors within the cable 90 which are exposed after shaving operation is performed will slide along the control surface 60. Thus, the cable shaving tool of the present invention may regulate the shaving depth of the tool by the differential between the cable channel and the control surface, instead of the overall length of the channel. In some embodiments, like those depicted in FIGS. 15-17, blade holder 20 may optionally include a bevel 28 or chamfer along a portion of the blade holder bottom 25 at the front end 20a and/or the rearward end 20b of the blade holder 20. Similarly, channel 24 may also include a chamfer or bevel 25 along the leading edge of the channel 24 to limit friction and facilitate movement of the shaving tool along the length of the cable 90. While the blade holder 20 of FIGS. 15-17 utilizes a bevel, the edges may similarly be rounded or any other similar contour which a person of skill in the art would utilize to facilitate movement of the tool along a cable.

The blade holder 20 of the present invention may be sized for a specific depth and diameter range for application purposes. By utilizing a removable blade holder, an operator may change the blade holders 20, which in turn would provide the operator with a guide channel 26 and cable channel 24 which is sized to accommodate a different cable or perform a different blade shaving depth. By loosening the fasteners 92, an operator may remove the blade holder 20 from the handle, and replace the first blade holder with a second blade holder which would provide for a different shaving depth or cable diameter without increasing the overall footprint of the cable shaving tool 10.

The handle 40 of the shaving tool of the present invention may have any construction which facilitates proper grip by an operator performing a cable shaving operation. In the embodiments depicted in FIGS. 4, and 7-9, handle 40 includes a flat portion with rounded edges for gripping of the shaving tool 10 by an operator. In the embodiments depicted in FIGS. 5-6 and 12-14, the handle 40' of the cable shaving tool 10 includes a rounded shaft, and may further include ridges along the shaft for an improved ergonomic grip by the operator. Other designs and modalities for the cable shaving tool of the present invention are not meant to be precluded, so long as the design contemplated provides for a shaving tool which may perform shaving operations along a cable jacket in having limited access areas.

In some embodiments, handle 40,40' may be rotatable along the axis 12, allowing the handle to move with respect to the blade holder 20 from a position approximately perpendicular to the cable axis to a position at an acute angle to the cable axis, including substantially parallel to the cable axis. The handle 40, 40' may be lockable in any position about the rotation or in discrete steps of the rotation.

Figure 13:
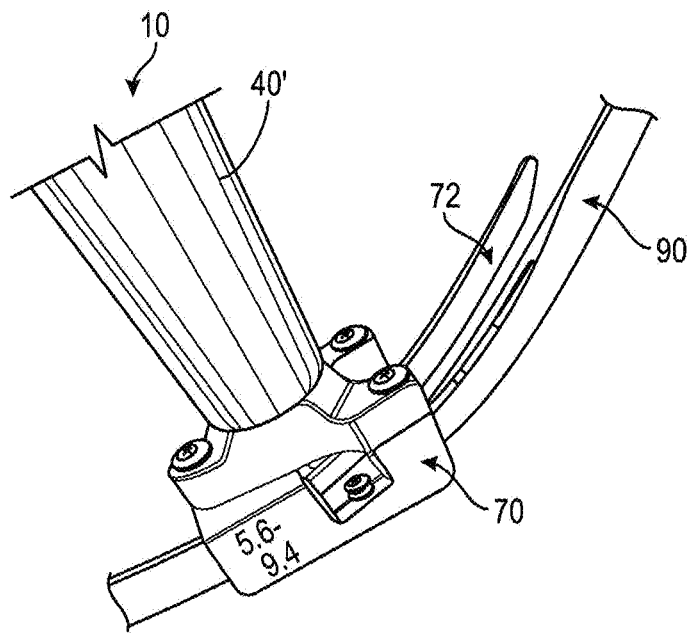
FIG. 13 is a perspective view of the cable shaving tool of the present invention during a cable shaving operation.
Figure 14:
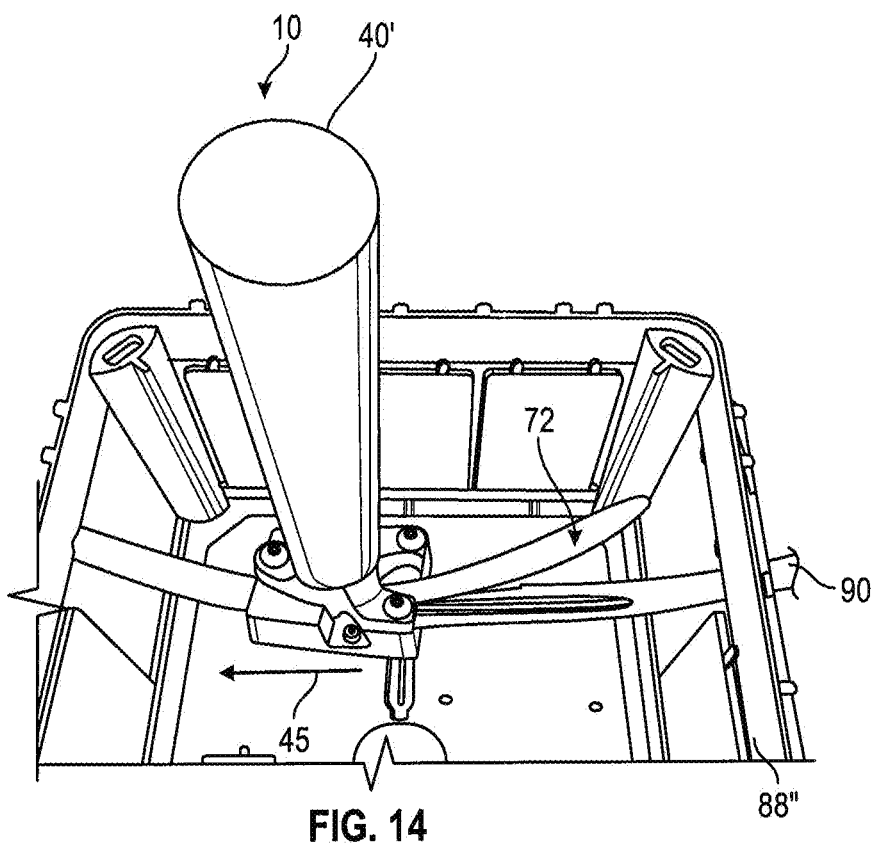
FIG. 14 is a top perspective view of the cable shaving tool of the present invention during a cable shaving operation within a junction box.

Turning now to FIGS. 4, 13 and 14, the method of performing a cable shaving operation on a cable is depicted. The handle 40 allows the end user to place the shaving tool 10 on a cable 90, apply light downward pressure 100 to set the blade 30, such that the blade edge 31 will begin to sever a portion of the outer jacket of cable 90 at an angle appropriate to remove only the outer cable jacket of cable 90. Once the blade is set along the cable 90, a pulling force is applied along the cable length in direction 45 to initiate the cut. As the shaving tool 10 is pulled along the length of the cable 90, jacket chip 72 to pass through the clearance area 70 of the tool, where it exits the shaving tool at the end 20b, allowing an operator to visually confirm the shaving depth along the cable 90. While the cable shaving tool of the present invention is used preferably for midspan applications, in particular to operations which include a junction box 88" (FIG. 14), other application of the shaving tool should not be precluded. In some embodiments, the cable shaving tool may be used along a cable end.

Due to the upright handle 40 and blade 30 which are along central, longitudinal axis 12, the cable shaving tool of the present invention may be used with particular ease in within a junction box, such as the junction box 88" depicted in FIG. 14. The method of operations allows an operator to maximize the span in which a cable may be stripped within a limited space, such as the enclosed junction box 88". The guide channel 26 of the blade holder 20 allows an operator to securely place the shaving tool 10 along the outer jacket of the cable and perform a cut operation on the cable 90 to allow access to the interior portion of the cable 90. Thus, a cable shaving operation may be readily achieved without an excessive tool chassis, and creates increased clearance while minimizing the footprint of the tool.

Thus, the present invention provides one or more of the following advantages: a ease of application in performing shaving operations; a minimal guide channel and overall tool length which allows for access to a cable interior portion in low clearance areas; guide channel which can control the blade depth without relying on channel size for precision; a shaving tool which performs shaving operations without need for twisting action; blade holder which may be sized to cut cables of differing diameters and shave at a plurality of depths; a shaving tool which may perform shaving operations without twisting actions; and a tool which allows for reduced tool footprint.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cable shaving tool for shaving of a cable jacket of a cable, the cable shaving tool comprising:
   a blade holder having a guide channel extending along a length of said blade holder for guiding the blade holder along a cable length, said guide channel further including a first end having a cable channel, and a second end having a control surface;
   a blade removably securable to a blade support surface of the blade holder and extending within the guide channel and between said first end and said second end, said blade support surface at a longitudinal axis of said cable shaving tool;
   said cable channel having an apex, said apex having a first distance to a second surface of said blade holder;
   said control surface having a second distance to said second surface of said blade holder; and
   a handle removably securable to said blade holder having a handle length extending along said longitudinal axis in a direction perpendicular to the guide channel;
   wherein the handle allows the end user to place the cable within the guide channel in contact with the control surface, apply a pressure on said cable in a direction towards the second surface to set the blade and then move said cable shaving tool in a direction parallel to said cable length to initiate the cut;
   wherein said blade initiates said cut a predetermined depth into said cable, such that said predetermined depth is a differential between said cable channel first distance and said control surface second distance.

2. The cable shaving tool according to claim 1, wherein said guide channel further includes a clearance area between said first end and said second end.

3. The cable shaving tool according to claim 2, wherein said clearance area is at the blade to allow for a cable jacket chip to pass through the cable shaving tool during said cut.

4. The cable shaving tool according to claim 1, wherein said cable shaving tool may be used for midspan shaving of said cable.

5. The cable shaving tool according to claim 1, wherein the cable shaving tool may be used for shaving an end of said cable.

6. The cable shaving tool according to claim 1, wherein said cable channel includes a bevel along said first end.

7. A blade holder for a cable shaving tool, said blade holder comprising:
   a housing having a first surface and a length;
   a guide channel extending within said housing length for guiding the blade holder along a cable length, said guide channel further including a first end having a cable channel, and a second end having a control surface;
   a blade support surface within an interior of said housing;
   a blade removably securable to said blade support surface such that an edge of said blade extends within the guide channel between said first end and said second end;
   said cable channel having an apex, said apex having a first distance to said first surface;
   said control surface having a second distance to said first surface;
   wherein after placement of a cable within said guide channel, said blade initiates a cut of a predetermined depth into said cable, such that said predetermined depth is a differential between said cable channel first distance and said control surface second distance.

8. The blade holder according to claim 7, wherein said guide channel further includes a clearance area between said first end and said second end.

9. The blade holder according to claim 8, wherein said clearance area is at the blade to allow for a cable jacket chip to pass through the blade holder during said cut.

10. The blade holder according to claim 7, wherein said cable channel includes a bevel along said first end.

11. A cable shaving tool for shaving of a cable jacket of the cable, the cable shaving tool comprising:
   the blade holder of claim 8; and
   a handle removably securable to the blade holder having a handle length extending along a longitudinal axis in a direction perpendicular to the guide channel,
   wherein the handle allows the end user to place the cable within the cable shaving tool guide channel, apply a pressure on the cable to set the blade and then move said cable shaving tool in a direction parallel to a length of the cable to initiate the cut.

\* \* \* \* \*